April 18, 1939.  E. H. PIRON  2,154,771
BODY BOLSTER CONSTRUCTION AND MOTOR VENTILATION SYSTEM
Filed May 25, 1936   2 Sheets-Sheet 1
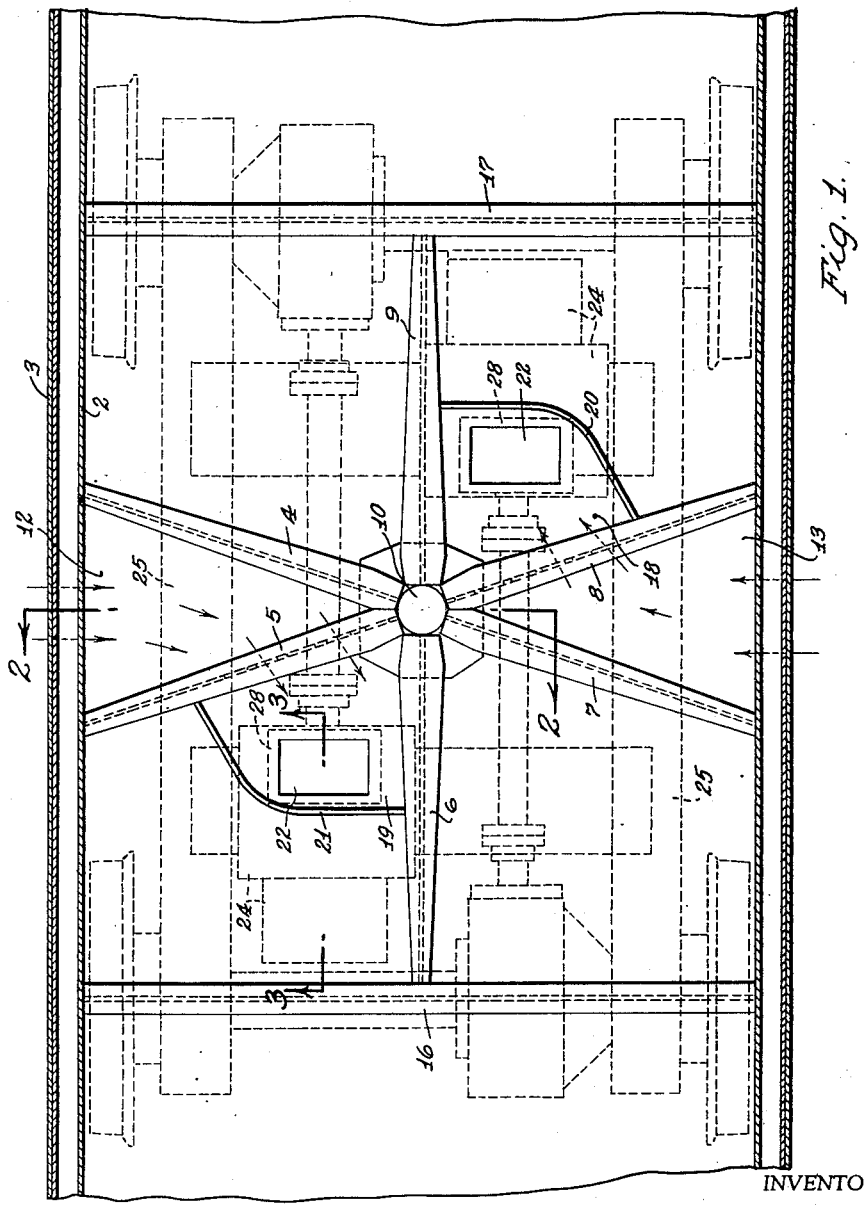
INVENTOR.
Emil H. Piron
BY
ATTORNEY.

April 18, 1939.　　　E. H. PIRON　　　2,154,771
BODY BOLSTER CONSTRUCTION AND MOTOR VENTILATION SYSTEM
Filed May 25, 1936　　2 Sheets-Sheet 2
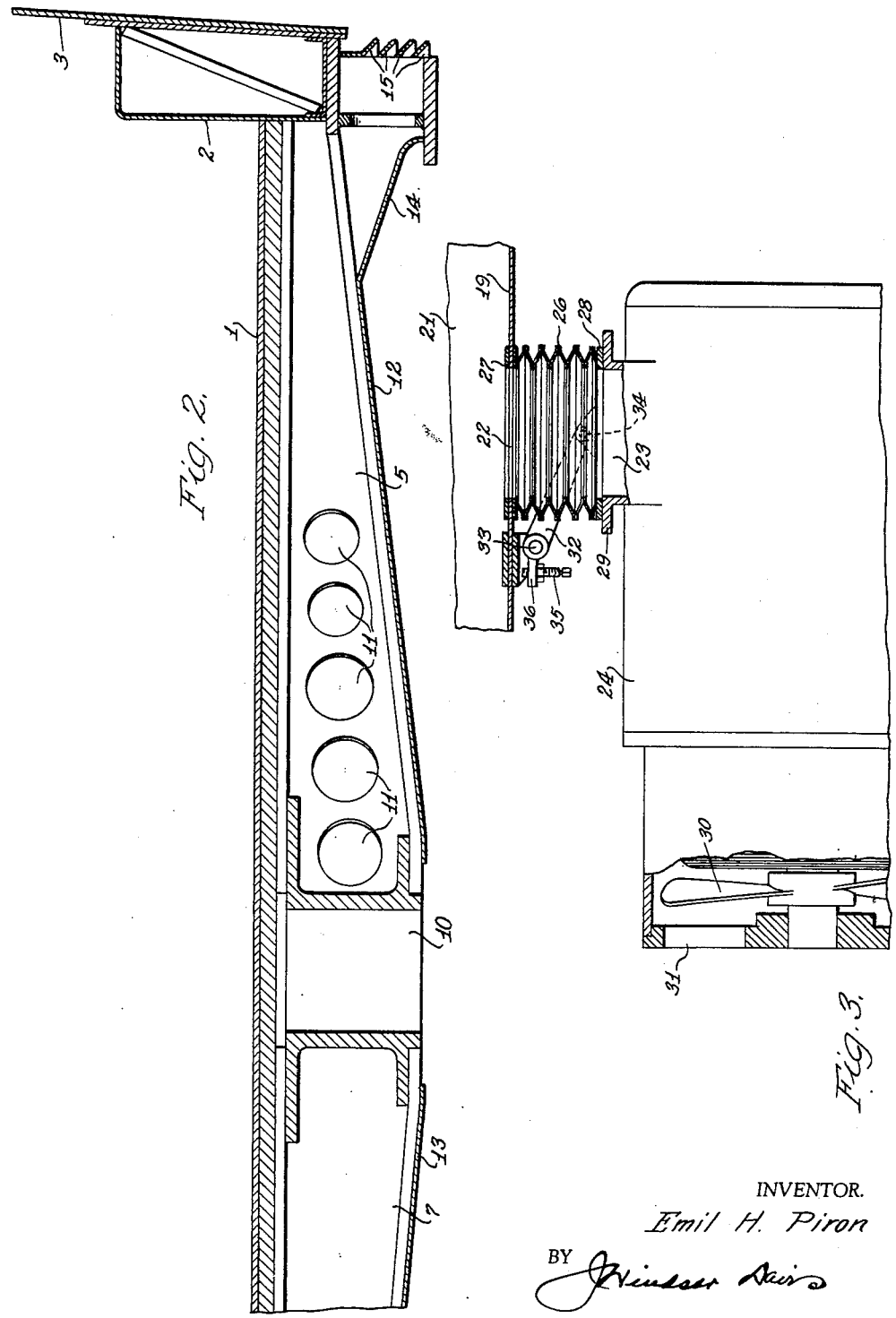
INVENTOR.
*Emil H. Piron*
BY
ATTORNEY.

Patented Apr. 18, 1939

2,154,771

UNITED STATES PATENT OFFICE 2,154,771

BODY BOLSTER CONSTRUCTION AND MOTOR VENTILATION SYSTEM

Emil H. Piron, New York, N. Y., assignor to Transit Research Corporation, New York, N. Y., a corporation of New York Application May 25, 1936, Serial No. 81,681

3 Claims. (Cl. 105—59)

This invention relates to the ventilation of electric motors beneath vehicles, such as street cars, and has for its object to provide a system for supplying an abundance of clean air to the motors.

Heretofore it has been customary to ventilate the motors with air which finds its way beneath the cars. This air is laden with dust, mud and water which deposits on the motors and interferes with cooling and insulation. It is therefore an object of this invention to provide means for supplying air to the motors from the side where it is relatively free of impurities rather than from beneath the car body.

Another object of this invention is to provide a body bolster of improved construction and in the form of a spider, and to employ the arms of the spider as walls in forming an air duct to the motors. The floor of the body rests on these arms and constitutes the third wall of the duct and a cover plate below these arms completes a portion of the duct.

The body bolster is capable of swivelling movement on the truck and hence cannot have a fixed connection with the motors which are carried by the truck. The truck and motors are also subject to numerous vertical and horizontal motions with respect to the body bloster and it is therefore another object of the invention to provide a further duct portion and a duct connection which will permit of all necessary relative movements between the bolster and the motors in such manner as to allow ample flow of air from the regions between the arms to the motors.

Other objects and advantages will become hereinafter more fully apparent as reference is had to the accompanying drawings wherein my invention is illustrated and in which Figure 1 is a horizontal section taken between the floor and the top of the body bolster of a rail car, the truck being largely indicated by dotted lines, Figure 2 is an enlarged vertical section taken along the line 2—2 of Figure 1, and Figure 3 is an enlarged vertical section taken along the line 3—3 of Figure 1.

More particularly, I indicates the floor of an electrically driven vehicle body. The body has longitudinal girders 2 and walls 3. The floor I rests on a body bolster composed of a plurality of arms 4, 5, 6, 7, 8 and 9 in spider formation radiating from a king pin holder or center bearing member 10. These arms are of rather deep construction and those numbered 5 and 8 have a plurality of large openings 11 transversely therethrough.

The arms 4 and 5 reach to one side girder 2 and the arms 7 and 8 reach to the other. Plates 12 and 13 cover the bottoms of these arms in pairs thus forming two enclosures with the arms and the bottom of the floor 1. The plates 12 and 13 are bent downwardly at their outer ends as illustrated at 14 with respect to plate 12 to form an air inlet from louvres 15 opening to the side of the car body. These louvres have a length substantially equal to the distance between the ends of the arms 4 and 5, and 7 and 8. These enclosures are portions of air ducts leading to the motors.

The arms 6 and 9 extend fore and aft of the king pin 10 for attachment to transverse body members 16 and 17. Plates 18 and 19 extend from the arm 9 to the arm 8 and from the arm 5 to the arm 6. An end wall 20 completes an enclosure formed by the arms 8 and 9, the floor 1 and the plate 18, and an end wall 21 completes an enclosure formed by the arms 5 and 6, the floor 1 and the plate 19. The enclosure horizontally bounded by the arms 4 and 5 is in communication with the enclosure bounded by the arms 5 and 6 by virtue of the openings 11 through the arms 5. Similarly, the enclosure bounded by the arms 7 and 8 is in communication with the enclosure bounded by the arms 8 and 9. Each of the plates 18 and 19 has an opening 22 therethrough directly above the air inlet 23 to electric motors 24 carried by a truck 25. The body 1, 2, 3 and hence the body bolster is capable of swivelling movement about the center bearing, and the truck with its motors is subject to up and down movements with respect to the body. In order to maintain an open air passageway from the louvres 15 to the motors a bellows 26 is secured at its top at 27 to each of the plates 18 and 19. Secured to the bottom of each bellows is a slide plate 28 for contact with the inlet passage 23 which is flanged at 29 for the purpose of receiving the plate.

The bellows 26 are substantially larger than the air inlets 23 in the direction of relative sliding movement so that the plates 28 are capable of substantial movement with respect to the flanges 29 without restricting the supply of air through the bellows to the motors. A fan 30 of any desired type draws air through the bellows, through the enclosures or ducts, and through the louvres, expelling it at the ends 31 of the motors.

In order to position the bellows 26 with respect to the open plates 28 and to prevent dislodgement I provide at least one arm 32 for pivotal attachment at 33 to the plates 18 and 19. The other end is pivotally attached at 34 to the plates 28. In order to adjust the pressure between the plates 28 and the flanges 29 I also provide an adjustment screw 35 for insertion through and extension 36 of the arm 32.

What I claim is:

1. In a rail car, a car body having a center bearing member, a body bolster comprising girders radiating from said member and in supporting contact with the floor of said body, a plate extending across the bottom of said girders thereby completing a box-like enclosure beneath the body proper, said enclosure being open to the atmosphere at the side of said body to constitute an air inlet and open at points remote from said inlet to constitute an air outlet, said enclosure constituting a part of a motor ventilating system.

2. In a rail car, a car body having a center bearing member, pairs of arms radiating from said member and constituting a body bolster, said bolster directly supporting the floor of said body, one pair of said arms extending to one side of said body, another pair of said arms extending to the other side of said body, a third pair of arms one extending forwardly of said center bearing member and the other extending rearwardly thereof, and plates connecting the bottoms of the members of those pairs which extend toward the sides of said body thereby forming two box-like enclosures, each of said enclosures being open to the atmosphere at the side of said body and each having openings through its walls near said center bearing member to constitute air passages, said enclosures constituting a portion of a motor ventilation system.

3. In a rail car, a car body having a center bearing member, pairs of arms radiating from said member and constituting a body bolster, said bolster directly supporting the floor of said body, one pair of said arms extending to one side of said body, another pair of said arms extending to the other side of said body, a third pair of arms one extending forwardly and the other rearwardly of said member, a truck equipped with motors and adapted to support said car body, plates connecting the bottoms of those pairs which extend toward the sides of said body, one arm of each of said last named pairs having openings therethrough, and further plates connecting the bottoms and sides of one of said fore and aft arms with the arms having openings therethrough thereby forming two distinct enclosures, said enclosures each being open to the atmosphere at the side of the car and each having an opening through the bottom thereof for supplying air to said motors.

EMIL H. PIRON.